United States Patent

Engelhart

[15] 3,689,574
[45] Sept. 5, 1972

[54] 3,4,5-TRIMETHYLCYCLOHEXANOL
[72] Inventor: John E. Engelhart, Westfield, N.J.
[73] Assignee: Esso Research and Engineering Company
[22] Filed: April 28, 1970
[21] Appl. No.: 32,729

[52] U.S. Cl............260/631 R, 260/631 H, 424/343, 71/3
[51] Int. Cl..........................C07c 35/08, A01n 9/24
[58] Field of Search....................260/631 R, 631 H

[56] References Cited

UNITED STATES PATENTS

| | | |
|---|---|---|
| 2,433,008 | 12/1947 | Whitaker et al........260/631 H |
| 3,121,728 | 2/1964 | Bartlett et al..........260/631 R |
| 3,323,984 | 6/1967 | Szabo et al............260/631 R |
| 3,385,902 | 5/1968 | Bright et al............260/621 R |

OTHER PUBLICATIONS

Ungnade et al., "J. Am. Chem. Soc.", Vol. 66, (1944), pages 118– 122, QD1A5
Rohm & Haas, " Chem. Abstract" , Vol. 58, (1963), col. 2517, QD1A51.

*Primary Examiner*—Leon Zitver
*Assistant Examiner*—Joseph E. Evans
*Attorney*—Chasan and Sinnock and John Paul Corcoran

[57] ABSTRACT

3,4,5-trialkylcyclohexanols characterized by the following structural formula:

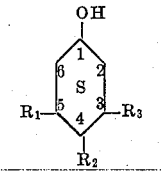

wherein $R_1$, $R_2$ and $R_3$ may be the same or different $C_1 - C_3$ alkyl groups. These compounds have been discovered to possess unique broad spectrum fungicidal activity.

1 Claim, No Drawings

3,4,5-TRIMETHYLCYCLOHEXANOL

This invention relates to a class of novel compounds. In one aspect this invention relates to new compositions of matter, namely, 3,4,5-trialkylcyclohexanols, wherein $R_1$, $R_2$ and $R_3$ may be the same or different $C_1$-$C_3$ alkyl groups. In another aspect this invention relates to the employment of 3,4,5-trialkylcyclohexanols as broad spectrum fungicides.

Although substituted cyclohexanols have long been known to the art, the specific compounds of this invention, 3,4,5-trialkylcyclohexanols, have never been prepared. These novel compositions can be characterized by the following general formula:

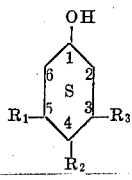

wherein $R_1$, $R_2$ and $R_3$ may be the same or different $C_{1\,1}$-$C_3$ alkyl groups.

Specific examples of compounds of this invention are the following:

| Compound | Name |
|---|---|
| 1 | 3,4,5-trimethylcyclohexanol |
| 2 | 3,4,5-triethylcyclohexanol |
| 3 | 3,4,5-tripropylcyclohexanol |
| 4 | 3, 5-dimethyl-4-ethylcyclohexanol |
| 5 | 3,5 -dimethyl-4-propylcyclohexanol |
| 6 | 3, 4-diethyl-5-methylcyclohexanol |
| 7 | 3, 4-dimethyl-5-ethylcyclohexanol |
| 8 | 3,5 -dipropyl-4-methylcyclohexanol |
| 9 | 3,5-di methyl-4-isopropylcyclohexanol |
| 10 | 3,5-di isopropyl-4-methylcyclohexanol |
| 11 | 3-methyl -4-propyl-5-ethylcyclohexanol |
| 12 | 3-ethyl-4- propyl-5-isopropylcyclohexanol |

3,4,5-trialkylcyclohexanols can be prepared by reducing 3,4,5-trialkylphenols. This reduction can occur at a temperature ranging from 50° to 300° C., preferably 100° C. to 200°C. under a hydrogen pressure of 500 psi to 5,000 psi, preferably from 1,000 psi to 2,500 psi. Suitable solvents for this reaction are as follows: lower alkanols, saturated hydrocarbon solvents, acetic acid, water and alcohol-water combinations.

Suitable hydrogenation catalysts for this reduction are Raney-Nickel, ruthenium, rhodium, rhenium, platinum oxide, each of which may be on a suitable support such as alumina, charcoal, kieselguhr, silica gel, barium or calcium carbonates. One pertinent starting reactant, 3,4,5-trimethylphenol, is a commercially available material and its preparation is described in U.S. Pat. Nos. 3,385,902 and 3,385,903.

A typical method of synthesis of 3,4,5-trimethylcyclohexanol is given in Example I.

3,4,5-trialkylcyclohexanols have been found to possess fungicidal properties. A 3,4,5-trialkylcyclohexanol can be made into a fungicidal composition by admixing one or more of the active ingredients with a conditioning agent of the kind used and referred to in the art as a pest control modifier to provide formulations adapted for ready and efficient application to soil or foliage using conventional applicator equipment.

The compounds of the invention have general fungicidal properties. They are especially useful in certain types of foliar fungus control such as, for example, in application to crop lands to give control of the common pathogens, without harming the crop plants.

Fungicidal compositions of the invention are prepared by admixing one or more of the active ingredients defined heretofore, in fungicidally effective amounts with a conditioning agent of the kind used and referred to in the art as a pest control adjuvant or modifier to provide formulations adapted for ready and efficient application to soil or foliage using conventional applicator equipment.

Thus, the fungicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With many solvents, such as alkylated naphthalene or other aromatic petroleum solvents, dimethyl formamide, cycloalkanones, relatively high up to about 50 percent by weight or more concentration of the active ingredient can be obtained in solution.

The fungicidal compositions of the invention whether in the form of dust or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1 percent or less. Usually, the minimum lower concentration will be 0.1 percent.

The fungicidal compositions are applied either as a spray, granular or a dust to the locus or area to be protected from fungal infection. Such application can be made directly upon the locus or area during the period of fungal infestation in order to destroy the fungal pathogen, but preferably, the application is made in advance of an anticipated fungus infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired fungicidal action. The amount of the 3,4,5-trialkylcyclohexanol present in the compositions as actually applied for destroying or preventing fungus infections will vary with the manner of application, the particular pathogens for which control is sought, the purpose for which the application is being made, and like variables. In general, the fungicidal compositions as applied in the form of a spray, dust or granular, will contain from about 0.1 to 100 percent by weight of 3,4,5-trialkylcyclohexanol.

Fertilizer materials, other fungicidal agents, and other pest control agents such as insecticides and herbicides can be included in the fungicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert, and as used, can be a solid or fluid. When solid carriers are used, they are preferably particulate, granular, or pelleted; however, other shapes and sizes of solid carrier can be employed as well. Such preferable solid carriers can be natural occuring minerals — although subsequently subjected to grinding, sieving, purification, and/or other treatments — including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity.

For some purposes, a resinuous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Arochlor", a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000°F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferable, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid, these materials can be sprayed on crops without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater details by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

EXAMPLE 1

SYNTHESIS OF 3,4,5-TRIMETHYLCYCLOHEXANOL

A solution of 100 g. of 3,4,5-trimethylphenol in 700 ml. of ethanol and 100 ml. of water was hydrogenated over 10 g. 5 percent ruthenium on charcoal in a 3 liter rocker bomb. The system was maintained at 125° C. and 1,000–1,500 psi hydrogen gas. After 6 hours, the reaction was cooled and after filtration of the catalyst, the solvent was removed on a rotary concentrator. Distillation of the residue through a 12 inch Vigreaux column yielded 59 g. of 3,4,5-trimethylcyclohexanol, b.p. 204°. The structure was verified by NMR spectroscopy.

EXAMPLE 2

The following test procedures are illustrative of those used to evaluate the fungicidal activity of a 3,4,5-trialkylcyclohexanol:

The test chemical is solubilized in acetone along with a suitable emulsifier and sufficient water is added to attain the desired concentration.

FUNGICIDES

Foliage - Tomato Early Blight

Procedure I. Tomatoes of the Bonny Best variety (4—5 weeks old) are placed on a revolving turntable and sprayed with a formulation of the test chemical at the concentration noted in Table I. As soon as the spray deposit has dried, the plants are inoculated with a spore suspension of the early blight fungus (*Alternaria solani*)

and placed in an incubation chamber for 24 hours, after which they are removed and held until lesions have developed. Visual ratings of control are then made.

Procedure II. Compounds are evaluated for the control of tomato late blight (*Phytophthora infestans*) in the same manner as given in Example 1 except infestation was performed with *Phytophthora infestans*. Comparisons with standard materials are made in a manner similar to that described for tomato early blight.

Foliage - Beam Powdery Mildew

Tender green bean plants with fully expanded primary leaves are inoculated with spores of the powdery mildew fungus (*Erysiphe polygoni*) 48 hours prior to application of test chemicals. Chemicals are applied at the concentration given in Table I using the same method as in the early blight test above. After the spray has dried, the plants are removed to the greenhouse and held for a period of 7–10 days, at the end of which time the amount of mildew on the primary leaves is rated.

Foliage - Bean Rust

Pinto beam plants with fully expanded primary leaves are inoculated with spores of the bean rust fungus (*Uromyces phaseoli*)) and incubated for 24 hours. Chemicals are then applied at the concentration given in Table I using the same method as in the early blight test above. After the spray has dried, the plants are removed to the greenhouse and held for a period of 7–10 days, at the end of which time the amount of rust is rated.

Foliage Systemic - Bean Rust

Pinto bean plants are inoculated 24 hours prior to use as above. Two plants are excised and placed in Erlenmeyer flask containing a solution of the test chemical concentration noted in the table. The plants are held for 24 hours and transferred to a flask containing nutrient solution and held for an additional 6 days, at the end of which time the amount of disease is rated.

Table I illustrates the broad spectrum fungicide activity of a typical compound (1) of this invention compared with other alkylcyclohexanols and normal paraffinic alcohols of similar carbon number. As is evident from the table this unique fungicidal activity is highly dependent on the substitution pattern of cyclohexanols. When the substituents are present in 3,4,5-position maximum fungicidal activity is observed. Sub-

TABLE I.—FUNGICIDE ACTIVITY

| Compound name | Structure | Rate (p.p.m.) | Early blight | Mildew | BR(E) | BR(S) | Late blight |
|---|---|---|---|---|---|---|---|
| 3,4,5-trimethylcyclohexanol | 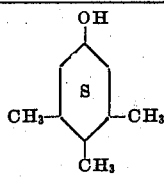 | 200<br>100<br>20 | 10<br>8<br>7.5 | 8<br>5<br>4 | 0<br>----------<br>---------- | 9<br>8<br>5 | 9<br>7<br>5 |
| 2,3,5-trimethylcyclohexanol | 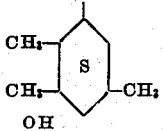 | 200 | 7 | 0 | 0 | 0 | ---------- |
| 4-n-propylcyclohexanol | 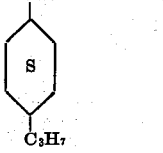 | 200<br>100<br>20 | 0<br>----------<br>---------- | 0<br>----------<br>---------- | 8<br>8<br>6 | 0<br>----------<br>---------- | ----------<br>----------<br>---------- |
| 2,3-dimethylcyclohexanol | 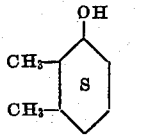 | 200 | 0 | 0 | 0 | 0 | ---------- |
| 3,5,5-trimethylcyclohexanol | 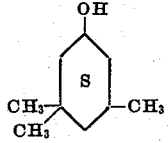 | 200 | 0 | 0 | 0 | 0 | ---------- |
| 3,3,5,5-tetramethylcyclohexanol | 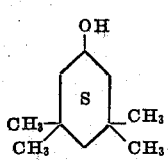 | 200 | 5 | 0 | 0 | 0 | ---------- |
| 5-nonanol | | 200 | 0 | 0 | 0 | 0 | ---------- |
| 1-nonanol | | 200 | 0 | 0 | 0 | 0 | ---------- |
| Cyclooctanol | | 200 | 0 | 0 | 0 | 0 | ---------- |

0=no fungal control.
1-3=slight fungal control.
4-6=moderate fungal control.
7-9=very high degree of fungal control.
10=complete control of fungus.

stituents in other positions impart either marginal fungicidal activity against one pathogen or no activity at all. It is also noteworthy that paraffinic alcohols containing the same number of carbon atoms as 3,4,5-trialkylcyclohexanols do not possess any fungicidal activity at all.

What is claimed is:
1. 3,4,5-trimethyl cyclohexanol.

* * * * *